(12) United States Patent  (10) Patent No.: US 8,587,900 B2
Franca-Neto et al.  (45) Date of Patent: Nov. 19, 2013

(54) RADIATOR-COOLED NANOWIRE-BASED WRITE ASSIST

(75) Inventors: Luiz M. Franca-Neto, Sunnyvale, CA (US); Bruce A. Gurney, San Jose, CA (US); Lidu Huang, Danville, CA (US); Vijay P. S. Rawat, San Jose, CA (US); Petrus A. Van Der Heijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/114,132

(22) Filed: May 24, 2011

(65) Prior Publication Data

US 2012/0301746 A1  Nov. 29, 2012

(51) Int. Cl.
*G11B 5/127* (2006.01)

(52) U.S. Cl.
USPC .................................................. 360/125.32

(58) Field of Classification Search
USPC ............... 360/125.3, 125.31, 125.32, 125.74, 360/125.75, 128
See application file for complete search history.

(56) References Cited

U.S. PATENT DOCUMENTS

| | | | |
|---|---|---|---|
| 6,665,136 B2 | 12/2003 | Clinton et al. | |
| 6,717,770 B1 | 4/2004 | Crawford | |
| 7,149,055 B2 | 12/2006 | Clinton et al. | |
| 7,187,520 B2 | 3/2007 | Lee et al. | |
| 7,212,367 B2 | 5/2007 | Clinton et al. | |
| 7,268,973 B2 | 9/2007 | Lille et al. | |
| 7,791,838 B2 | 9/2010 | Sato et al. | |
| 2003/0043490 A1* | 3/2003 | Clinton et al. | 360/55 |
| 2006/0044682 A1 | 3/2006 | Le et al. | |
| 2006/0174474 A1 | 8/2006 | Le | |
| 2007/0115584 A1 | 5/2007 | Balamane et al. | |
| 2007/0137027 A1 | 6/2007 | Lille | |
| 2007/0146930 A1 | 6/2007 | Hsu et al. | |
| 2008/0112087 A1 | 5/2008 | Clinton et al. | |
| 2008/0259493 A1 | 10/2008 | Kief et al. | |
| 2008/0316631 A1 | 12/2008 | Gao et al. | |
| 2008/0316643 A1 | 12/2008 | Linville et al. | |
| 2009/0002895 A1 | 1/2009 | Pust et al. | |
| 2009/0021861 A1 | 1/2009 | Vas'ko et al. | |
| 2009/0109570 A1 | 4/2009 | Scholz et al. | |
| 2009/0154011 A1 | 6/2009 | Hsiao et al. | |
| 2009/0262636 A1 | 10/2009 | Xue et al. | |
| 2010/0118439 A1 | 5/2010 | Aoki | |
| 2011/0090584 A1 | 4/2011 | Franca-Neto et al. | |
| 2011/0090596 A1 | 4/2011 | Franca-Neto et al. | |

FOREIGN PATENT DOCUMENTS

JP  2514624 B2  7/1996

* cited by examiner

*Primary Examiner* — Joseph Feild
*Assistant Examiner* — Gustavo Polo
(74) *Attorney, Agent, or Firm* — Patterson & Sheridan, LLP

(57) ABSTRACT

An apparatus for cooling a nanowire in a wire assisted magnetic recording head using a radiator in close proximity to a shield of the write pole. The radiator may further contain current restraints (e.g., slits, cuts, or resistive materials) that maximize current density in the nanowire at a location that corresponds to the current restraints. These current restraints may be further arranged to align with a write pole such that the current is forced to flow primarily through the nanowire when the nanowire is closest to the write pole. The nanowire may then be used either as main or auxiliary writing element for recording signals to a high coercivity media. Moreover, the nanowire and radiator may be combined into a single nanofoil which has a least two portions that perform a similar function as both the nanowire and radiator.

24 Claims, 13 Drawing Sheets

RADIATOR-COOLED NANOWIRE-BASED WRITE ASSIST

BACKGROUND OF THE INVENTION

1. Field of the Invention

This invention relates to thin film perpendicular magnetic head structures. Specifically, the invention relates to structures for cooling nanowires that aid in writing data to high coercivity media.

2. Description of the Related Art

As bit areal densities in magnetic recording continue to progress in an effort to increase the storage capacity of hard disc drives, magnetic transition dimensions and recording head critical features are continuing to shrink. To make the recording medium stable at higher areal bit densities, magnetically harder medium materials with higher coercivity are required. Typically, writing to a harder medium is achieved by increasing the saturation magnetization of the magnetic material comprising the inductive write head; however, current technology is rapidly reaching the limits of known materials in this regard. A further consequence of higher areal densities is an increase in data rates. At very high data writing rates, it becomes increasingly difficult to switch the magnetization of the recording medium using a conventional write field as well as the magnetization of the conventional write pole.

One technology proposed to overcome these difficulties is the wire assisted magnetic recording head (WAMR) which utilizes a single nanowire surrounding three sides of a pole tip. If used as the only magnetic field producing element, the nanowire has the potential to produce higher writing speeds and data rates (due to its lower inductance). In such devices, the nanowire is the main coil for writing the data signals to the media. In other devices, an RF AC signal is added to the data signal being written by the nanowire to aid in switching the media. One of the main difficulties of using a nanowire to write data is the very large current densities required to generate a strong magnetic write field. These high current densities produce high temperatures in the nanowire which may lead to unwanted diffusion and electromigration in the nanowire. In an attempt to control temperatures, heat sink structures located at the ABS are employed to cool the wire as well as deliver current to the wire element itself However, due to the small cross sectional area of the nanowire element, cooling by conduction out of the wire is of limited utility.

Improved methods and structures for writing data to high coercivity media are needed.

SUMMARY OF THE INVENTION

The present invention generally relates to thin film perpendicular magnetic head structures. Specifically, the invention relates to structures for cooling a nanowire that aids in writing data to high coercivity media.

One embodiment of the invention provides a perpendicular head. The perpendicular head includes a write pole where a surface of the write pole is exposed at an air bearing surface of the perpendicular head. The perpendicular head includes a shield layer comprising a magnetic material and a nanowire that is substantially parallel to at least one side of the write pole, where the nanowire permits current to flow therethrough to produce a magnetic field at the surface of the write pole exposed at the air bearing surface. The perpendicular head also includes a radiator connected to the nanowire and disposed between the shield layer and the write pole. The radiator is arranged to transfer heat from the nanowire to the shield layer.

One embodiment of the invention provides a perpendicular head. The perpendicular head includes a write pole where a surface of the write pole is exposed at an air bearing surface of the perpendicular head. The perpendicular head also includes a nanofoil substantially parallel to at least one side of the write pole, where the nanofoil permits current to flow therethrough to produce a magnetic field at the surface of the write pole exposed at the air bearing surface. Moreover, the nanofoil has a current restraint that limits an amount of the current flowing through the current restraint relative to a portion of the nanofoil without the current restraint. The current restraint is arranged such that a portion of the current restraint is substantially parallel to the at least one side of the write pole. The perpendicular head further includes a shield layer comprising a magnetic material. A portion of the nanofoil is disposed between the shield layer and the write pole and is arranged to transfer heat from the nanofoil to the shield layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention is generally related to using current in a nanowire at a tip of a write pole to generate a magnetic field in the write pole that changes the polarity of high coercivity media. To dissipate the heat generated by flowing a large current through a nanowire, a radiator transfers heat away from the nanowire without significantly decreasing the current density in the nanowire.

Figure 1:
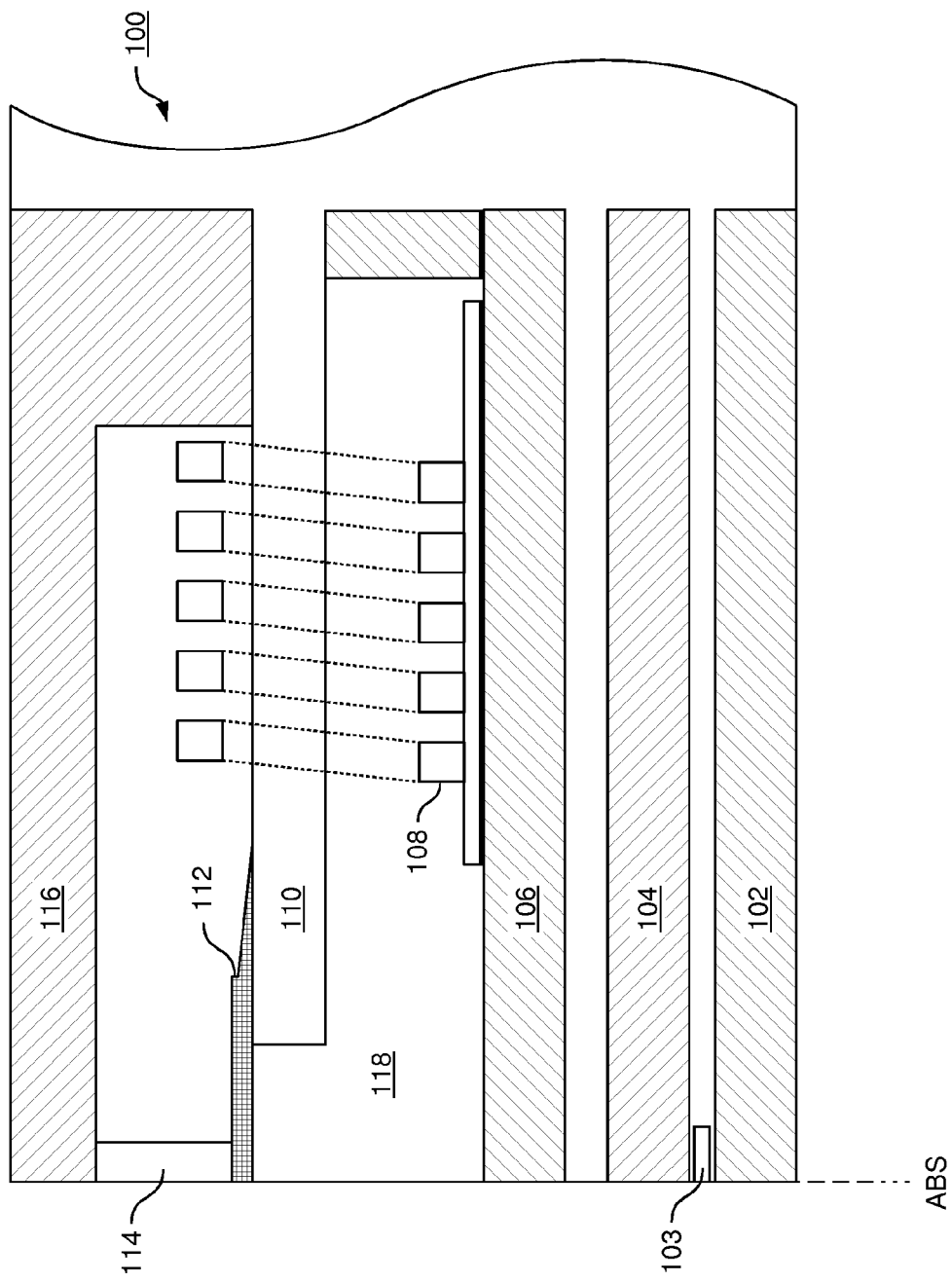
FIG. 1 is a partial cross section view of a typical perpendicular thin film head having a conventional coil, according to embodiments of the invention.

FIG. 1 is a partial cross section view 100 of a typical perpendicular thin film head having a conventional coil. The head comprises shield layers 102, 104; read element 103; shaping layer 110; coil structure 108; main pole 112; lower return pole layer 106; shield 114; filler layer 118; and upper return pole layer 116. Structure 114 may be a trailing shield or wrap-around shield (WAS). In general, the coil structure 108 conducts a current that produces a magnetic field with the objective of saturating the main pole 112. The shield layers 102, 104 absorb rogue magnetic flux and focus the magnetic field (not shown). The magnetic field returns to the return pole layers 106, 116. The embodiments of the present invention, however, may be used with or without the use of the coil structure 108. That is, a nanowire may be used either produce an auxiliary magnetic field or as the main writing element to induce a magnetic field in the main pole 112 to change the polarity of the magnetic material in the magnetic disk. As such, the nanowire can both decrease the switching time for changing the polarity of the main pole magnetization as well as augment the magnetic field produced by the head when writing to the media.

Figure 2:
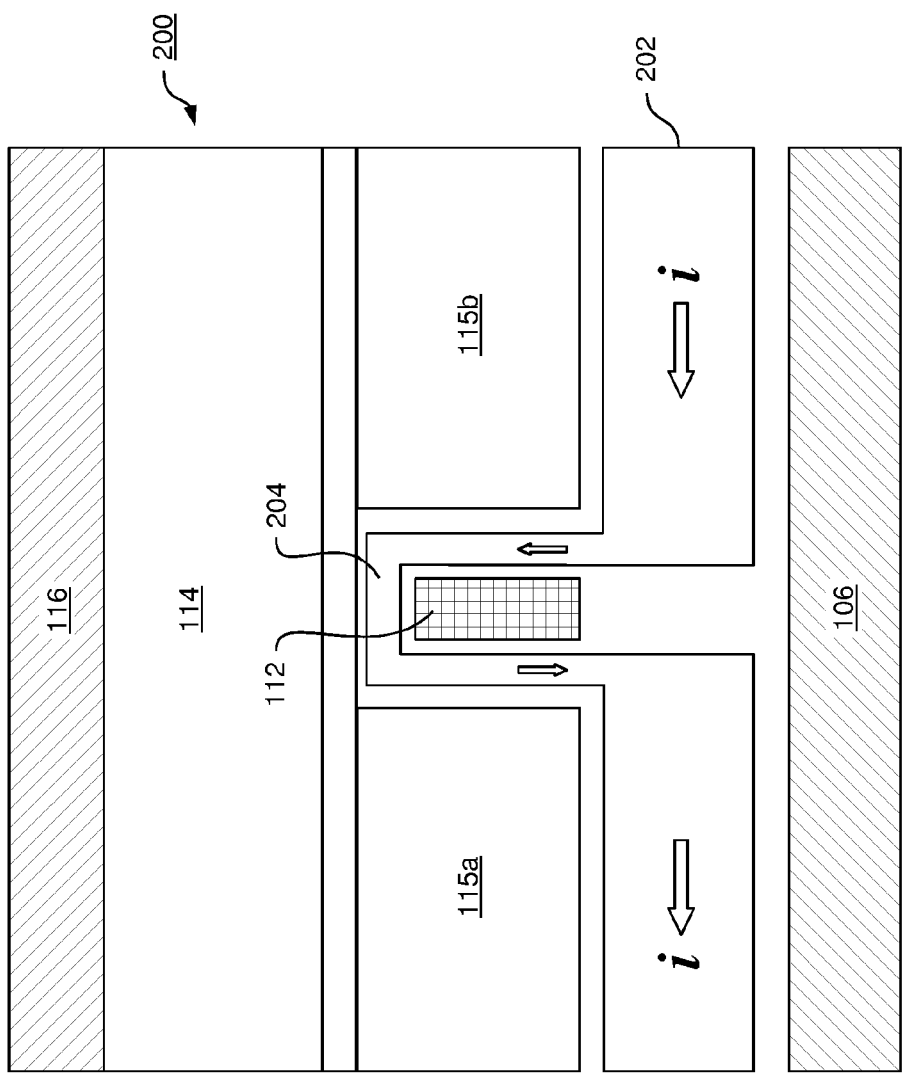
FIG. 2 is a simplified ABS (air bearing surface) view of a WAMR head, according to embodiments of the invention.

FIG. 2 is a simplified ABS (air bearing surface) view 200 of a WAMR head. In this head structure, nanowire 204 surrounds three sides of main pole 112 (the pole tip), and receives current from the conductive element 202, which also may serve as a heat sink for heat generated by the nanowire 204. The nanowire 204 may have a small cross sectional area to minimize the gap between the pole 112 from the shield elements 114, 115a, and 115b. The low inductance of the nanowire 204 combined with the small cross sectional area results in high current densities with fields strong enough to write to high coercivity media. Though the coil structure 108 is not illustrated in FIG. 2, the nanowire 204 may be a write assist for the coil structure 108. In other embodiments of the present invention, the nanowire 204 may be the main writing element for the main pole 112—i.e., the coil structure 118 is not included in the write head. Nonetheless, these high currents can create high temperatures, particularly in the nanowire 204 section above the pole tip that is furthest from the heat sink connections. These high temperatures are undesirable as they induce electromigration and diffusion of components in and surrounding the nanowire 204. However, relying solely on the conductive element 202 to remove the heat generated in the nanowire limits the maximum current density possible in the nanowire 204.

Figure 3A:
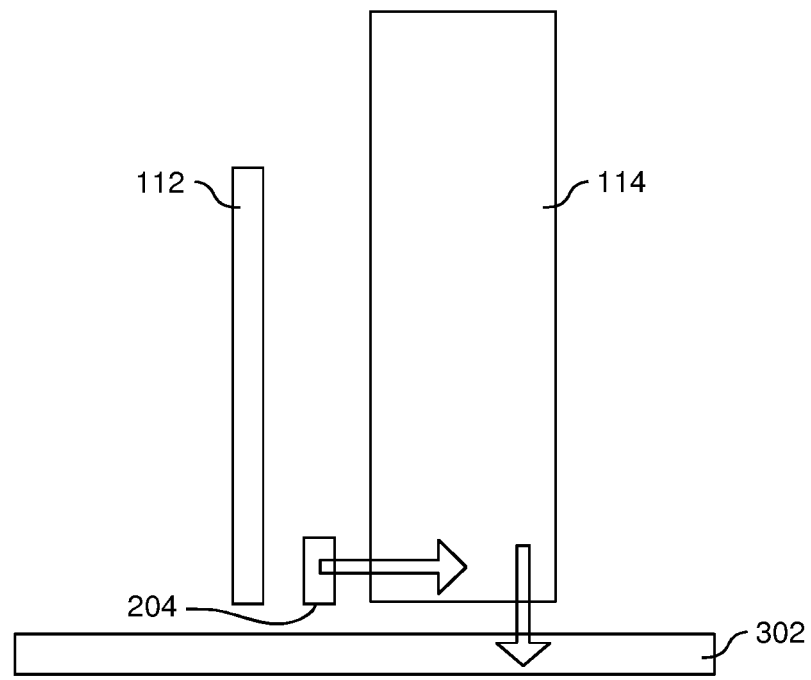
FIGS. 3A-3B are block diagrams illustrating the flow of heat away from a nanowire of FIG. 2, according to embodiments of the invention.
Figure 3B:
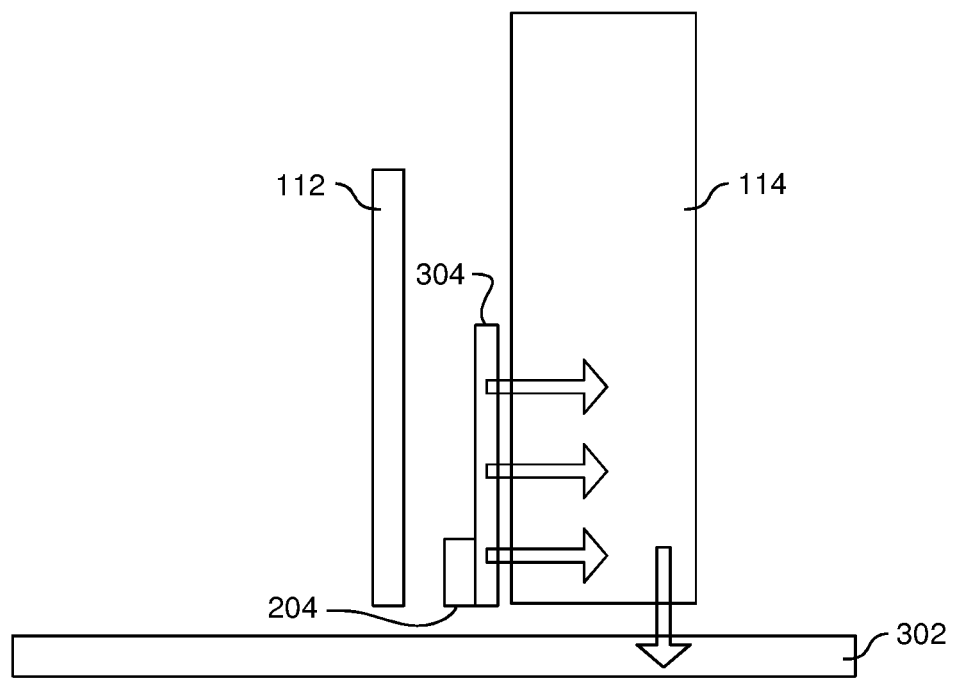

FIGS. 3A-3B are block diagrams illustrating the flow of heat away from the nanowire 204 of FIG. 2, according to embodiments of the invention. The small cross sectional dimensions of the nanowire 204 results in a high current densities and high temperatures. FIG. 3A illustrates what was previously unknown about how heat dissipates from the nanowire 204: excess heat produced by the nanowire 204 travels to the shield 114 and from there to the magnetic disk 302. It was previously thought that heat sinks, thermally and electrically coupled to the ends of the nanowire 204, could sufficiently dissipate heat from the nanowire 204. Instead, the majority of the heat transfer occurs between the nanowire 204 and the shield 114. Moreover, the shield 114 may be a WAS that includes shields 114, 115a, and 115b as illustrated by FIG. 2. The nanowire 204 is in close proximity to these shields 114, 115a, 115b which makes the WAS an ideal component to dissipate the heat from the nanowire 204.

FIG. 3B illustrates a structure that benefits from the discovered phenomenon illustrated by FIG. 3A. Instead of relying on a close proximity between the nanowire and the shield 114 to dissipate the heat generated by the high current density, the structure may include a radiator 304. The radiator 304 increases the surface area of the nanowire and facilitates the exchange of heat between the nanowire and the shield 114. Because the radiator 304 facilitates additional thermal energy transfer from the nanowire 204 to the WAS, more current may be fed into the nanowire 204 without subjecting the nanowire 204 to the deleterious effects of additional heat. However, an effective radiator 304 is often a good conductor of electricity as well as heat. Accordingly, adding the radiator 304 to the nanowire 204 may affect the current density in the nanowire 204. It has been found that a nanowire plus radiator structure (referred to herein as "the combined structure") requires 9-15% more current to generate the same magnetic field in the write pole as with the nanowire 204 alone. However, the combined structure permits as much as twice the current to flow than if the nanowire 204 did not have the radiator 304 to facilitate the heat transfer.

A nanowire 204 preferably comprises of metal with high electrical conductivity, such as noble metals or copper, and that are stable and not prone to corrosion during manufacturing or operation of the nanowire 204. In one embodiment, the radiator 304 may comprise of the same high electrically conductive metal as the nanowire 204. Doing so simplifies manufacturing and ensures good thermal coupling. However, this design choice may also minimize the current density in the nanowire 204—i.e., the current may freely travel on either the radiator 304 or the nanowire 204. For example, if the nanowire 204 and the radiator 304 are both made of copper, the current introduced into the nanowire 204 will spread out across both the nanowire 204 and the radiator 304. This lessens the current density at the nanowire near the pole tip and weakens the auxiliary (or primary) magnetic field induced in the write pole 112.

Generally, the thickness (i.e., the distance between the write pole 112 and the shield 114) at the widest point of the nanowire plus radiator structure is approximately 20 nm. The height of the combined structure at the tallest point, as measured from the ABS surface in a direction normal to the magnetic disk 302, may range from 40-500 nm. As used herein, a "short radiator" refers to a maximum height of a radiator of less than approximately 150 nm while a "tall radiator" refers to a maximum height between 150 nm to 500 nm. The height of the nanowire 204 (without the radiator 304) may vary between 20-100 nm.

In one embodiment, the radiator 304 may be a material with a lower conductivity than the nanowire 204. A lower conductivity material discourages the flow of current into the radiator 304, thus maintaining a higher current density in the nanowire 204. This embodiment comes with a tradeoff, however. In most materials the thermal conductivity and the electrical conductivity are directly proportional—i.e., a material with a high thermal conductivity will have a high electrical conductivity and vice versus. When a material with a lower electrical conductivity is chosen for the radiator 304, the material may also have a lower thermal conductivity than the material used for the nanowire 204. Accordingly, the current density in the nanowire 204 is increased but the ability of the radiator to transfer heat from the nanowire 204 to the shield 114 is inhibited relative to a radiator 304 made of a material with the same or even higher electrical conductivity then that of the nanowire 204 material.

Figure 4A:
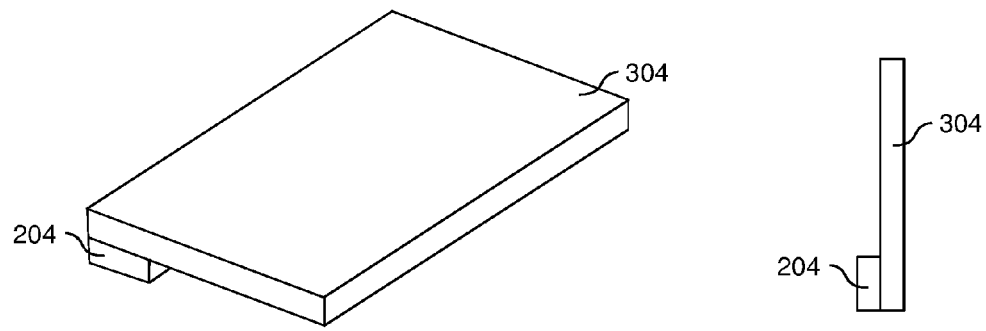
FIGS. 4A-4B are block diagrams illustrating different nanowire and radiator combined structures, according to embodiments of the invention.
Figure 4B:
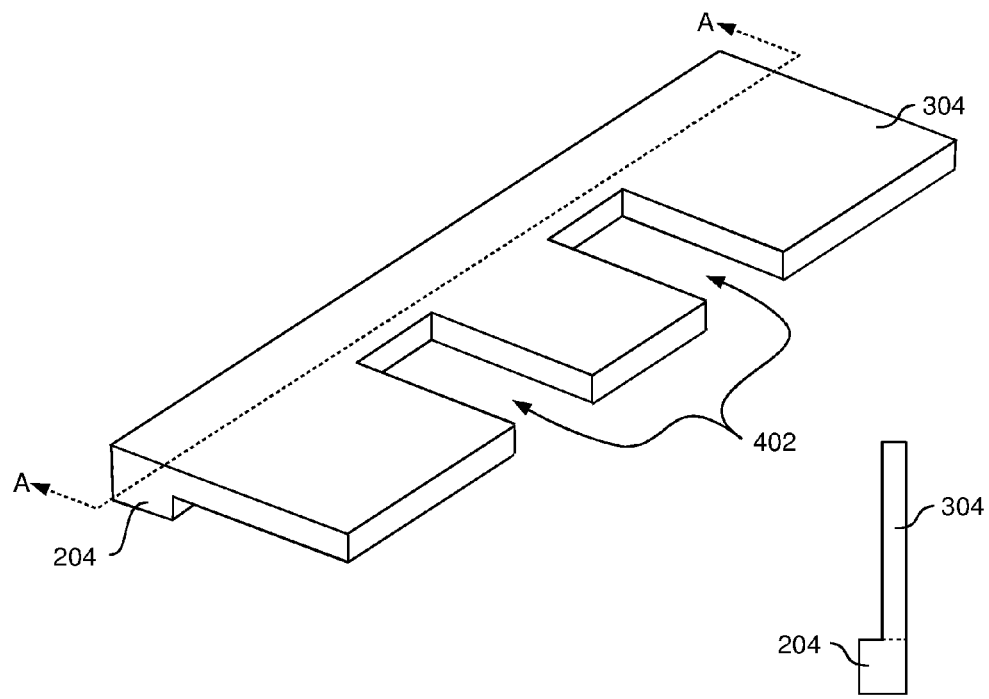

FIGS. 4A-B are block diagrams illustrating different combined structures, according to embodiments of the invention. FIG. 4A illustrates a nanowire 204 with an accompanying radiator 304 each consisting of a different material. For example, the nanowire 204 may be copper while the radiator 304 is a material of lower electrical conductivity such as tantalum or ruthenium. In this manner, the combined structure maintains the current density in the nanowire 204 but reduces the heat transfer between the nanowire 240 and the WAS.

Alternatively, the radiator 304 of FIG. 4A may be made of a material with a higher electrical (or thermal) conductivity than the nanowire 204. Here, the radiator 304 increases the heat transfer from the nanowire 204 to the WAS but lowers the current density in the nanowire 204.

FIG. 4B illustrates forming current restraints, such as slits, in the radiator 304. As mentioned previously, using the same material, or a material with higher electrical conductivity, for the radiator 304 than that of the nanowire 204 may lessen the current passing through the nanowire 204. The current restraints 402 minimize that loss. FIG. 4B illustrates the use of two current restraints 402 though as few as one may be used. Assuming that current flows in the combined structure along the line A-A, the current restraints 402 force the current to flow through the nanowire 204 at the respective locations of the current restraints 402. Advantageously, at those respective locations the current density of the nanowire 204 is at a maximum. As will be discussed in greater detail below, the tip of the write pole 112 may be aligned with one or more of the current restraints 402 such that when the nanowire 204 is nearest to the write pole tip, the current density in the nanowire 204 is at the maximum, thereby generating a strong magnetic field in the write pole. Moreover, the current restraint 402 is not limited to the cubic shape shown in FIG. 4B. The constraint may be any shape that limits the flow of current in the radiator yet still encourages the heat transfer between the nanowire 204 and the shield 114. The slit shown in FIG. 4B completely stops current from flowing through the current restraint 402 but other current restraints 402 may only limit the amount of current—i.e., have a finite resistance. Examples of other current restraints 402 include triangular shapes, vertical and horizontal slits, grating, implanting dopants into the radiator 304, depositing a resistive material into the slit, oxidizing a portion of the radiator 304, or any other means known to a person of ordinary skill in the art to limit current flowing in a conducting material.

A current restraint 402 may permit the use of radiator material 304 that has a higher electrical and thermal conductivity than the nanowire 204 material. In such a case, the current density in the nanowire 204 would decrease when the nanowire 204 is in contact with the radiator. However, if the current restraint is a slit (which removes the radiator material at that location) all of the current will be forced to travel through the nanowire 204. Thus, at that location, the current density of the nanowire 204 is at the desired level. If the current restraint 402 is aligned with a side of the write pole, then the desired auxiliary magnetic field is generated in the write pole. At the same time, the combined structure benefits from the higher thermal conductivity of the radiator 304 which increases the efficiency of the heat transfer to the WAS. Nonetheless, the current restraints 402 may also be used with a radiator 304 material that has a lower electrical conductivity than the nanowire 204 material to further constrain the current to within the nanowire 204.

In the cross-sectional illustration of FIG. 4B, the ghost line represents the height on the combined structure where the current restraint begins. To force all of the current to flow through the nanowire 204, the height at which the current restraints 402 begin would be at the maximum height of the nanowire 204 though they are not limited to such. Stated differently, the current restraints 402 divide the single radiator shown in FIG. 4A into three radiator portions shown in FIG. 4B.

Figure 5A:
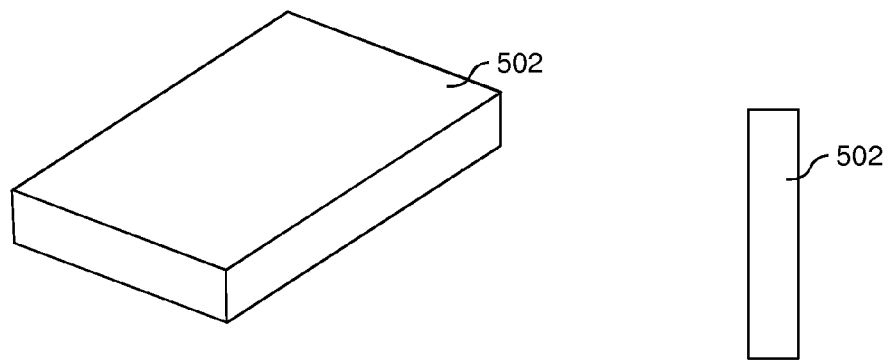
FIG. 5A-5B illustrate block diagrams of a nanofoil, according to embodiments of the present invention.
Figure 5B:
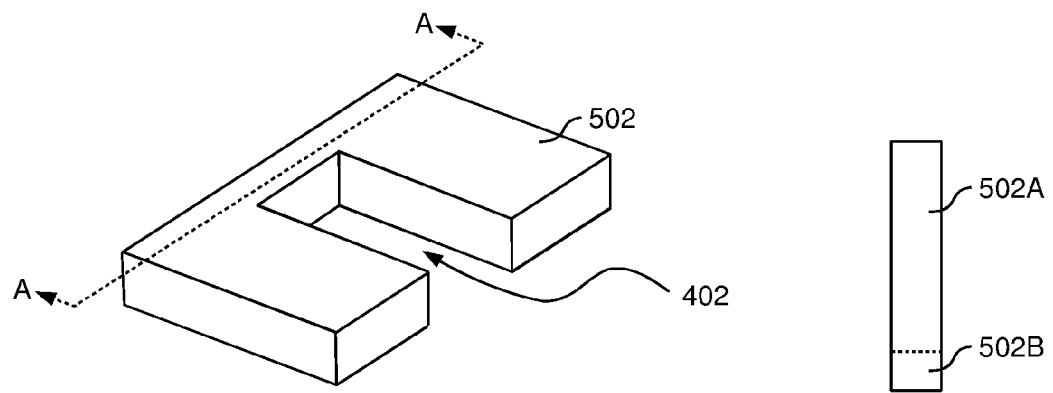

FIG. 5A-5B illustrate block diagrams of a nanofoil, according to embodiments of the present invention. A nanofoil 502 is a combination of a nanowire 204 and a radiator into one component. That is, the nanofoil has a nanowire portion and a radiator portion. Instead of a combined structure with a nanowire 204 and a radiator which each may have a different thickness, the nanofoil 502 has a consistent thickness throughout. However, like the combined structure, the nanofoil 502 may be made by a plurality of different layers of materials (e.g., a combination of copper and tantalum layers). In FIG. 5A, the nanofoil 502 is composed of a single material that performs the functions of both the nanowire 204 and the radiator 304. FIG. 5B adds a current restraint 402 to the nanofoil 502 so that when current flows along the line A-A, the current density of the nanofoil 502 at the location of the current restraint 402 is increased. Though only one current restraint 402 is shown, the nanofoil 502 may include a plurality of restraints and come in any form mentioned above.

The ghost line in the cross-sectional illustration of the nanofoil 502 shows the beginning of the current restraint 402. In one embodiment, the current restraint 402 begins at the same height of the nanowire 204 of FIGS. 4A and 4B. At that height, the current restraint 402 effectively creates a nanowire portion 502b at the location of the current restraint 402. Accordingly, the current density of that point is the same as the current density in a combined structure disclosed in FIG. 4A. The nanofoil 502 above the height of the nanowire portion 502b is defined as the radiator portion 502a. Moreover, the material used to manufacture the nanowire portion 502b may be different than the material used to create the radiator portion 502a. For example, the nanowire portion material 502b may have a higher electrical conductivity than the material of the radiator portion 502a.

Figure 6A:
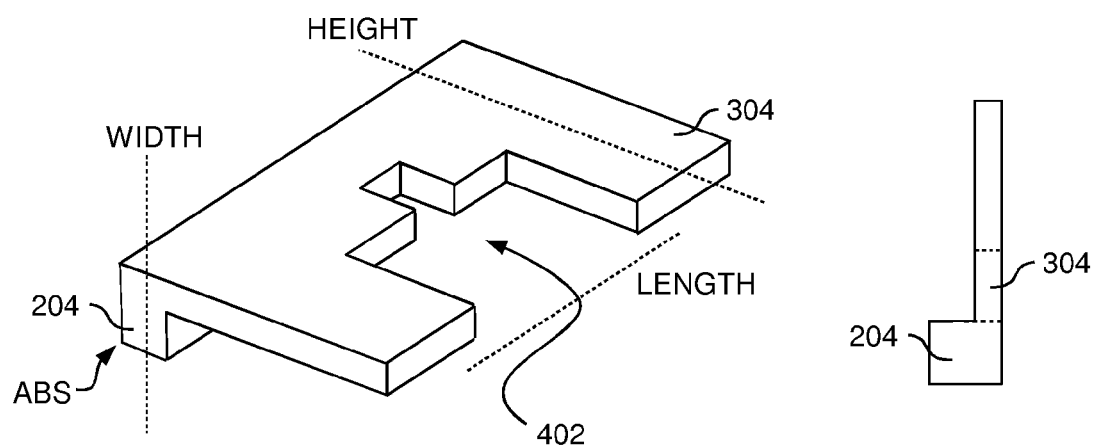
FIGS. 6A-6B illustrate block diagrams of a combined structure and a nanofoil, according to embodiments of the present invention.
Figure 6B:
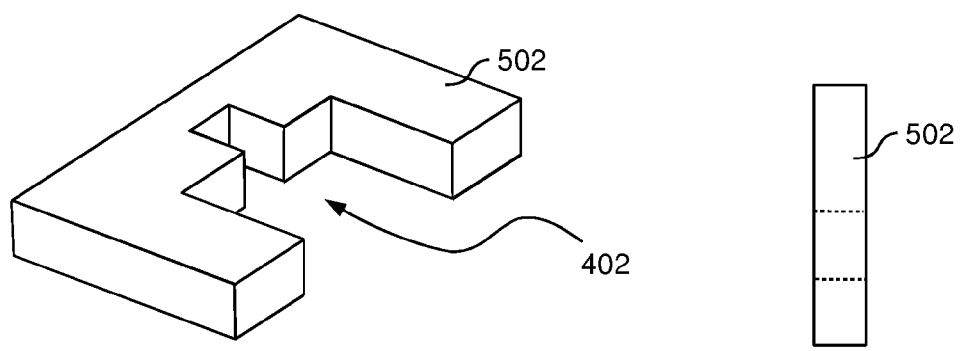

FIGS. 6A-6B illustrate block diagrams of a combined structure and a nanofoil, according to embodiments of the present invention. FIG. 6A shows a combined structure 204, 304 with a current restraint 402 with multiple heights to facilitate a tall radiator. For example, the maximum height of the radiator may be 500 nm. The current constraint 402 may have a multiple levels to permit maximum transfer of heat yet allow the radiator 304 to coincide with prior art write poles. Many write poles, for example, have a flare point that occurs at approximately 70 nm in a direction normal to the ABS. Until the flare point, the length of the write pole (as shown in FIG. 6A) is typically around 40 nm. Accordingly, a radiator may be designed to have a height greater than 150 nm by implementing a two level current restraint 402. In one embodiment, the current restraint 402 begins at the height of the nanowire 204 with a length of 40 nm—i.e., the length of the write pole. This permits the current restraint 402 and write pole to be aligned such that the current density is focused primarily in the nanowire 204 when the nanowire 204 is closest to the write pole, thereby having the greatest effect on the write pole. This lower portion of the current restraint may continue until a height of 70-150 nm The upper portion of the current restraint 402 may then continue up to 500 nm.

The ghost lines in the cross-sectional illustration of FIG. 6A show the two beginning heights of the two levels in the current restraint 402. One of ordinary skill in the art will recognize, however, that the current restraint 402 may be created by using a variety of different shapes (e.g., triangular) or materials.

FIG. 6B illustrates a similar current restraint 402 except in a nanofoil 502. The effect is the same, however, since current restraint 402 may be aligned with the write pole so that the current density of the nanofoil 502 is limited to a similar cross sectional area as a nanowire 204 when the nanofoil 502 is nearest to the write pole. Also, the ghost lines of the cross-sectional illustration show the beginning heights of the two levels of the current restraint 402 (e.g., the height of the nanowire 204 and the flare point of the write pole).

Figure 7:
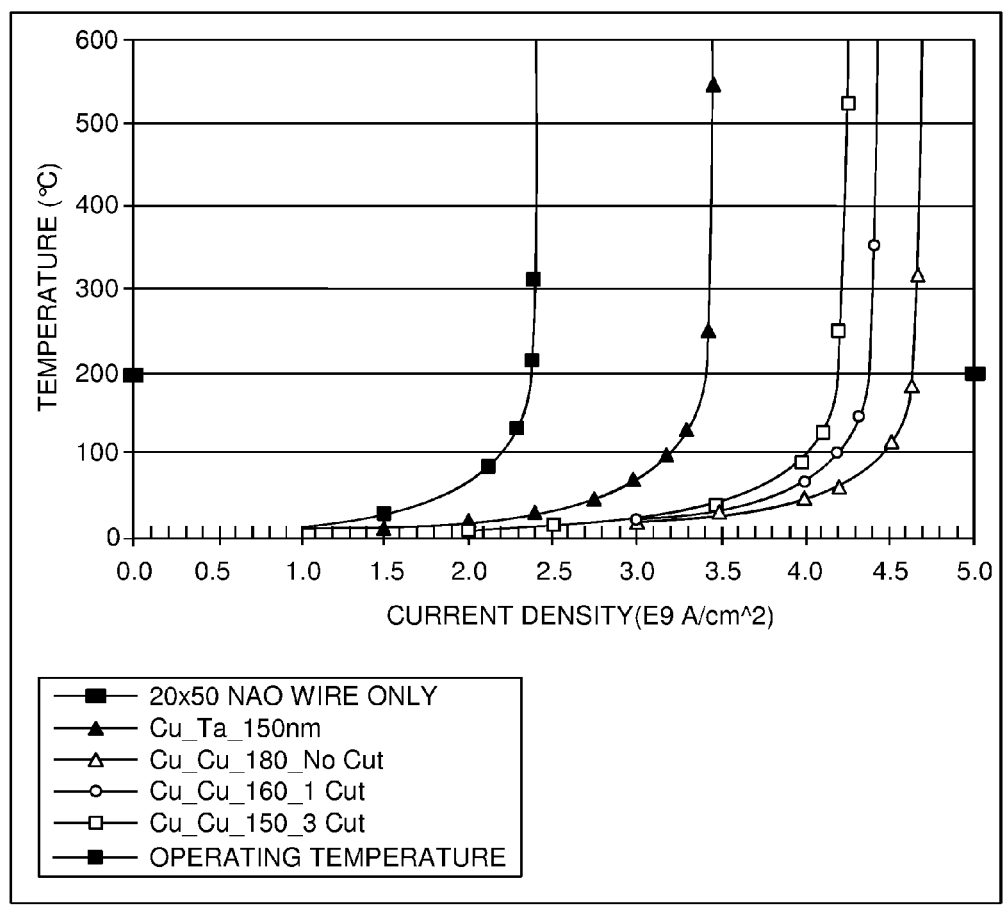
FIG. 7 is a chart recording experimental data associated with different embodiments of the combined structures.

FIG. 7 is a chart recording experimental data associated with different embodiments of the combined structures. Specifically, the chart records the temperature produced in the nanowire 204 with a corresponding current density (measured in A/cm$^2$ where the area is determined by the width and height). At an iso-temperature (e.g., 200° C.) a copper nanowire without a radiator (20 nm width and 50 nm height) can achieve a maximum density current of approximately $2.3\times10^9$ A/cm$^2$. Adding a tantalum radiator with a height of 150 nm increased the maximum current density to around $3.3\times10^9$ A/cm$^2$. Adding a copper radiator increases the maximum current density to $4.6\times10^9$ A/cm$^2$. Including one or three slits (i.e., current restraints 402) to the copper radiator decrease the maximum current density to $4.3\times10^9$ A/cm$^2$ and $4.1\times10^9$ A/cm$^2$, respectively. As expected the data suggests that a copper nanowire and radiator without slits is the best for thermal exchange. However, in such a case, the current is able to flow throughout the entire combined structure, and as mentioned previously, the strength of the assisting magnetic field depends strongly on the location of the current density. Thus, the slits may be aligned with the write pole to focus the current in the correct area, i.e., the tip of the write pole. Further, FIG. 7 shows that using slits enable the use of a current density that is almost double the maximum current density possible when using only a nanowire. In general, the combined structures can support current densities beyond $2\times10^9$ A/cm$^2$ which produce an auxiliary magnetic field greater than 1 kOe.

Figure 8A:
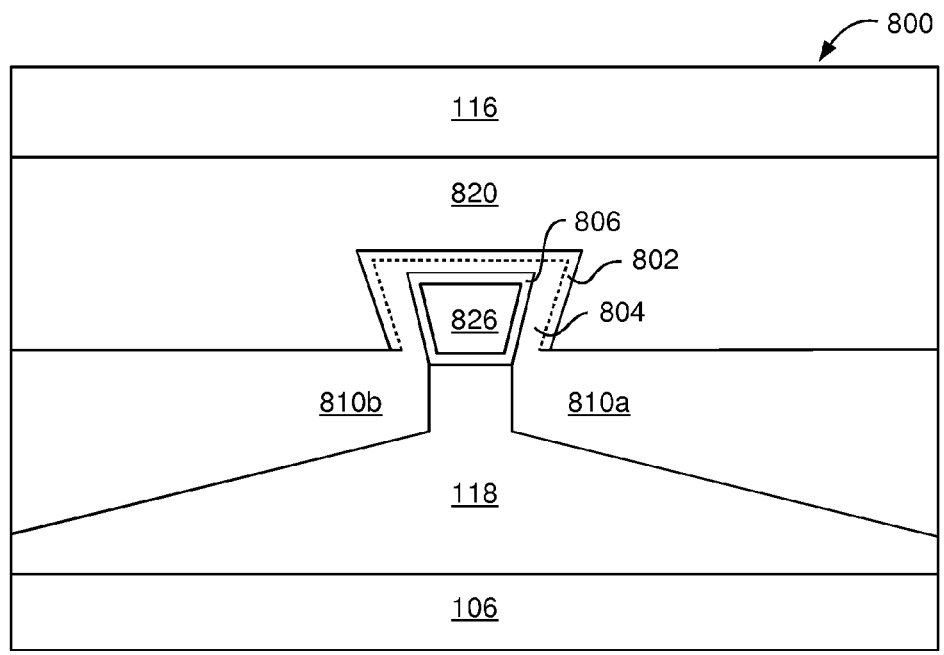
FIGS. 8A-8B are block diagrams of a combined structure in a write head, according to an embodiment of the invention.
Figure 8B:
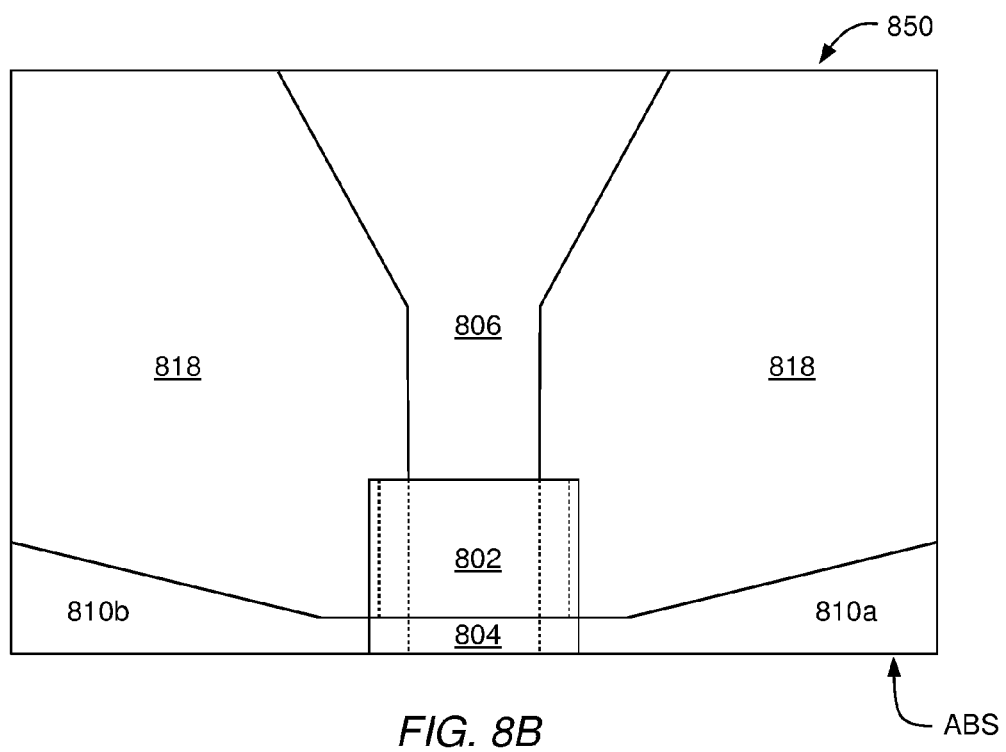

FIGS. 8A-8B are block diagrams of a combined structure in a write head, according to an embodiment of the invention. FIG. 8A is an ABS view 800 of nanowire 804, in accordance with an embodiment of the present invention. In this view, pole tip 826 is encircled on three sides by the nanowire 804. Electrical current is delivered to nanowire 804 by horizontal conductive members 810a and 810b which may be AC, DC, or some combination of both—e.g. a high-frequency current with a DC offset. Preferably the nanowire 804 is located at or near (e.g., within a few tens of nanometers) the ABS. Moving the nanowire 804 farther from the ABS weakens the effect of the auxiliary magnetic field in the magnetic media (i.e., the magnetic disk).

The WAS 820 surrounds the nanowire 804. An insulating layer (not shown) may be used between nanowire 804 and WAS 820 if desired. Since the nanowire 804 is placed between the write pole 826 and the WAS 820, it increases the effective gap, and therefore should be kept as thin as possible. Increasing the gap reduces the effectiveness of the shield. However, a thinner nanowire 804 will be limited to lower total currents to manage resistive heating resulting from high current densities. For this reason, a single coil WAMR implementation having very high currents may not be practical for perpendicular heads with WAS. In the present invention, however, current flows can be kept high enough to support a single coil implementation because the nanowire 804 uses a radiator 802 to efficiently transfer heat from the nanowire 804 to the WAS 820.

FIG. 8B illustrates a partial plan view 850 of FIG. 8A according to an embodiment of the present invention. Note that the return pole layer 116 and any filler layers above insulating layer 806 (such as portions of filler layer 118) are removed. However, the write pole 826 is electrically insulated from the current flowing in the nanowire 804 by the insulating layer 806 which conforms to the outside of the write pole 826. The insulating layer 806 may comprise of an insulator such as alumina, silicon oxide, or any other similar material known in the art. Moreover, the WAS 820 surrounds the radiator 802 and nanowire 804, thereby providing the primary medium for the heat transfer. Though FIG. 8B is not drawn to scale, the radiator 802 may be a short radiator which has a height less than the height of the flare point of the insulating layer 806. A tall radiator having a height greater than the height of the flare point may also be used. The nanowire 804 receives current through the horizontal contacts 810a and 810b. These contacts 810a,b may also act as heat sinks The write pole 826 and insulating layer 806 as shown have a flare point where the pole begins to increase in width. In one embodiment, the pole begins to flare at a height of 70 nm relative to the ABS. The nanowire 804 is adjacent to the tip portion of write pole 826. Ghost lines further indicate that the radiator 802 is separated from the insulating layer 806, and thus, the write pole 826. Advantageously, this separation lessens the effect of any current flowing in the radiator 802 from minimizing the auxiliary magnetic field generated in the tip of the write pole 826. Also, the depicted radiator 802 does not have any current restraints though in another embodiment it may, for example, have one or more slits that constrain the current to the nanowire 804 in the location of the slit. A dielectric or other non-magnetic material may be place between the radiator 802 and the write pole 826 to support the structure.

Note that the radiator 802 and nanowire 804 may be replaced by a nanofoil. In such a case, the gap between the radiator 802 and insulating layer 806 would be filled by the nanofoil. In one embodiment, the combined structure or nanofoil is separated from the WAS by a thin dielectric (not shown in FIG. 8B) and, in general, the combined structure or nanofoil matches the contour of the WAS. That is, the combined structure or nanofoil imitates the shape of the surface or surfaces of the WAS that face the write pole. The nanofoil, nanowire 804, and radiator 806, may be made up of one single material or a plurality of materials. For example, the nanowire 804 may be made up of copper while the radiator 806 consists of tantalum. In that case, current restraints may not be necessary to maintain a large current density in the nanowire 804. Similarly, the nanofoil may also consist of multiple layers of materials.

Figure 9A:
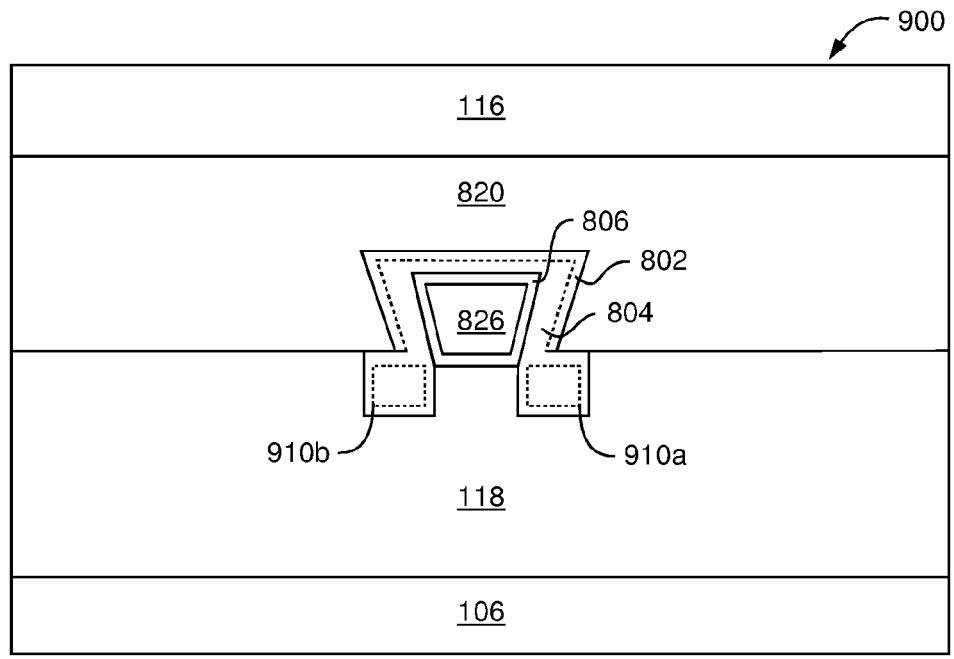
FIGS. 9A-9B are block diagrams of a combined structure in a write head, according to an embodiment of the invention.
Figure 9B:
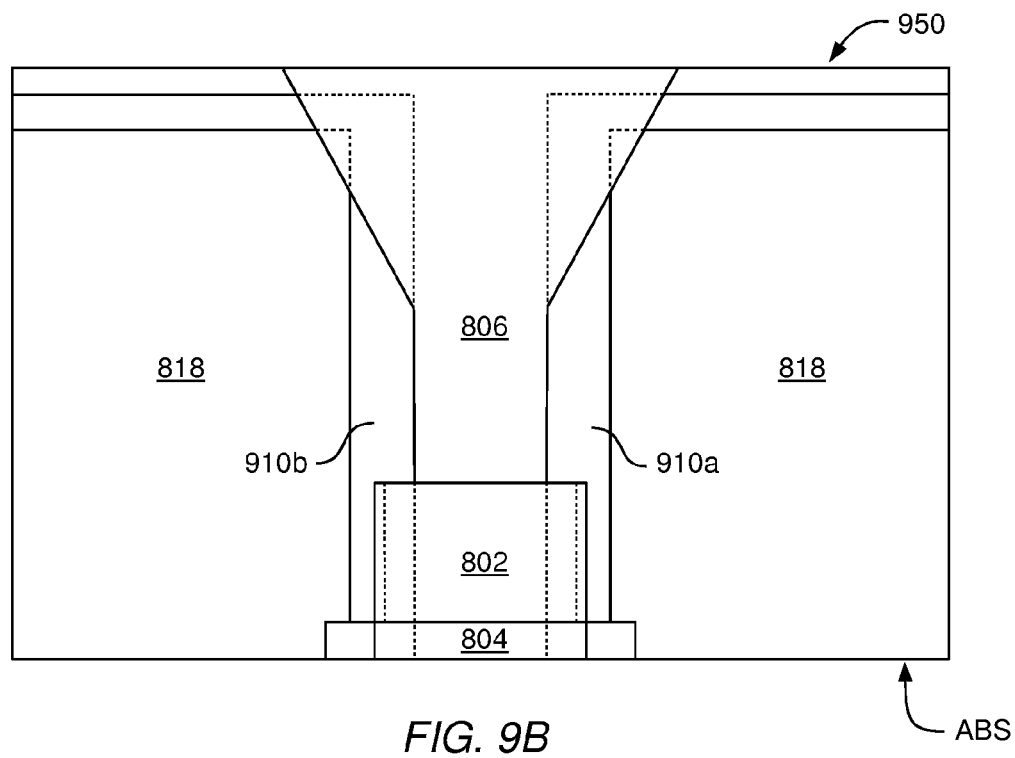

FIGS. 9A-9B are block diagrams of a combined structure in a write head, according to an embodiment of the invention. FIG. 9A is an ABS view 900 of a nanowire 804 with a radiator 802. FIG. 9B is a partial plan view 950 of the structure disclosed in FIG. 9A. Note that this is a plan view of the structure of FIG. 9A with the return pole layer 116 and any filler layers above insulating layer 806 (such as portions of filler layer 118) removed. Vertical conductive members 910a and 910b deliver current to and from the nanowire 804. The vertical conductors 910a and 910b are arranged as a symmetric feed configuration, which provides head switching assist with the appropriate common mode current and media writing assist with the appropriate differential mode current. Though vertical conductive members 910a and 910b are shown as being adjacent and parallel to the insulating layer 806 that conforms to the write pole 826, one of the vertical conductive members 910a,b may be moved so that it is no longer adjacent to the insulating layer 806. This asymmetrical positioning of the vertical conductive members 910a,b may decrease the time needed to switch the magnetization of the pole tip.

In one embodiment, the nanowire 804 or the nanofoil may be used as the primary writing element. In such as case, the current delivered by the vertical conductive members 910a,b to the nanowire 804 or nanofoil provides the necessary magnetic field to alter the polarity of the magnetic material in the magnetic disk. In other words, the use of a radiator 802 enables the current density of the nanowire 804 or nanofoil to provide the write pole with the required magnetic field without the aid of a coil structure 108. Alternatively, the write head shown in FIGS. 9A-B may use a coil structure 108 to minimize the current flowing through the nanowire 804 or nanofoil—i.e., the nanowire 804 or nanofoil is an auxiliary writing element.

Similar to FIGS. 8A and 8B, the radiator 802 and nanowire 804 of FIGS. 9A and 9B may be replaced by a nanofoil. In such a case, the gap between the radiator and insulating layer 806 would be filled by the nanofoil.

Figure 10A:
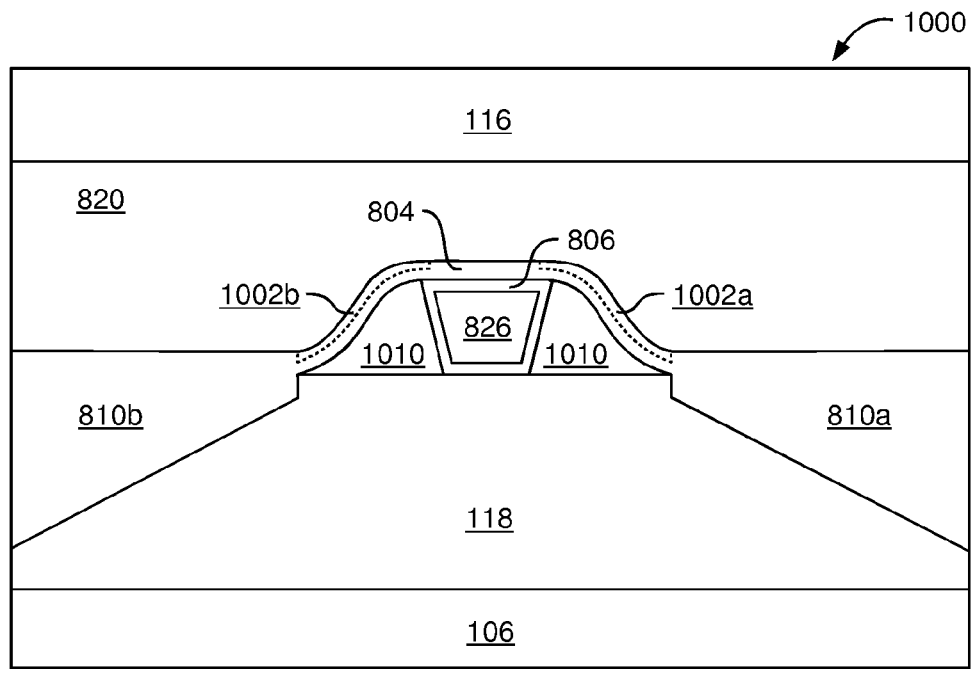
FIGS. 10A-10B are block diagrams of a combined structure in a write head, according to an embodiment of the invention.
Figure 10B:
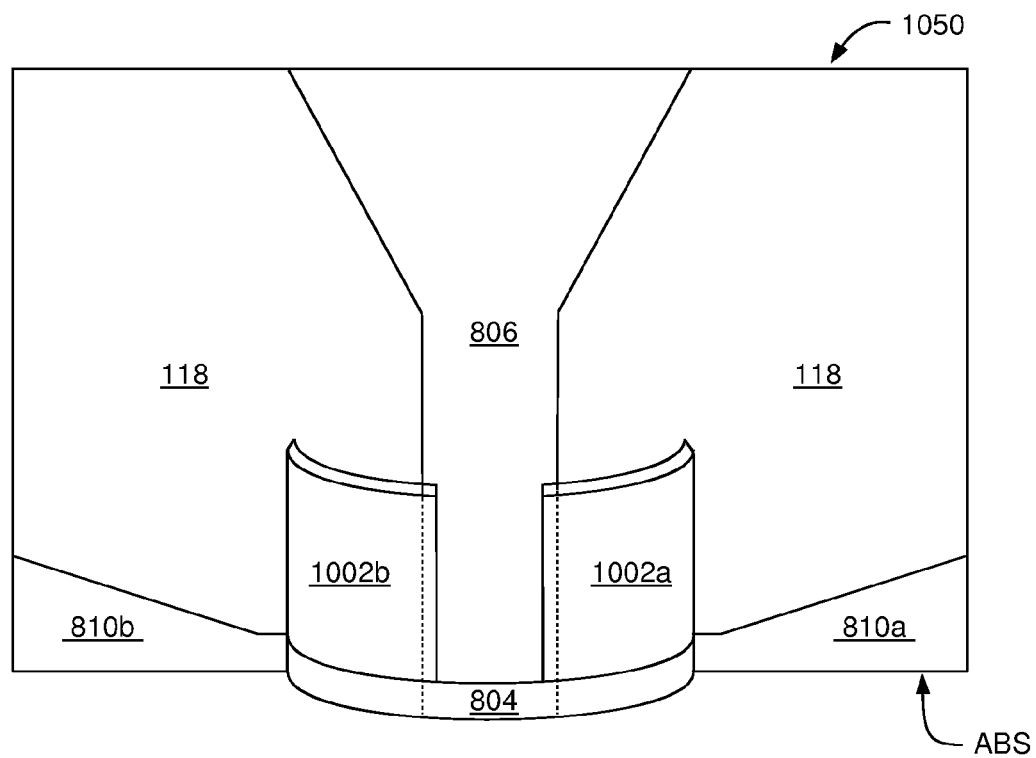

FIGS. 10A-10B are block diagrams illustrating a combined structure according to an embodiment of the present invention. FIG. 10A is an ABS view 1000 of combined structure 804, 1002a,b that is close to the write pole 826 on only one side contrary to the previous embodiments which surrounded the write pole on three sides. Stated differently, the nanowire 804 is substantially parallel to one side of the write pole 826 near the air bearing surface so that a current through the nanowire 804 produces a magnetic field near the tip of the write pole 826. Note that the combined structure may surround the write pole 826 on two sides or all four sides as well. Further, the write pole may have a curved side or sides. In such a case, the nanowire 804 may still be arranged in parallel with at least a portion of a curved side of the write pole 826. As used herein "parallel" includes three dimensional surfaces that are equidistant—e.g., concentric spheres are parallel. Layer 1010 may be added to support the particular design of the combined structure. Support layer 1010 may be any non-magnetic material that reinforces the design of the combined structure, such as silicon or aluminum oxide. Further, unlike in FIGS. 8-9, the ghost lines indicate that the radiator 1002a,b includes a current restraint. The width of the slit corresponds to the width of the write pole 826. This arrangement prevents the magnetic field produced by any current flowing in the radiator 1002a,b from interfering with the magnetic field produced by the current flowing in the nanowire 804. Instead, the current density in the nanowire 804—especially the portion of the nanowire 804 that is closest to the write pole 826—controls the auxiliary magnetic field generated in the write pole 826. The slit, however, does not need to precisely line up with the write pole 826. For example, the slit may be smaller or larger in width (i.e., the direction the current flows in the nanowire 804) and still produce the desired effect. Further, the conformal insulator 806 around the main pole 826 may be omitted if the nanowire 804 is insulated from the main pole 826 by the support layer 1010 (e.g., the support layer 1010 is silicon oxide or silicon nitride).

FIG. 10B is a plan view 1050 of the combined structure shown in FIG. 10A. The radiator 1002a,b may align with the write pole 826 (not shown). The slit (or current restraint) divides up the radiator into portions 1002a,b. The slit also forces the current flowing between the horizontal conductive members 810a,b to pass only through the nanowire 804 at the point where the nanowire 804 is closest to the write tip 826. In one embodiment, the slit is as wide as the write pole—approximately 40 nm. Moreover, the radiator 1002a,b may be either a tall or short radiator that extends either above the flare point of the insulating layer 806 and write pole 826 or below it. Additionally, one portion of the radiator—e.g., portion 1002b—may have a maximum height greater or less than the other portion 1002a of the radiator.

The combined structure 804, 1002a,b may include additional current restraints such as shown in FIG. 4B. For example, the combined structure 804, 1002a,b may have a plurality of slits instead of one. Alternatively, the combined structure may have more than one type of current restraints, such as one slit and one portion made up of a resistive material. Also, the slit may be greater than 40 nm when the combined structure surrounds multiple sides of the write pole 826. For example, assuming that the write pole 826 shown in FIG. 8A (which surrounds the write pole 826 on three sides) has a 40 nm width and an 80 nm length, then the slit may run approximately 200 nm along the direction of the flow of the current so that the current is focused only in the nanowire 804 when the nanowire 840 is near the write pole 826. One of ordinary skill will recognize the different ways of combining and arranging current restraints such that the current density in the nanowire 804 is maximized at desired locations.

Figure 11A:
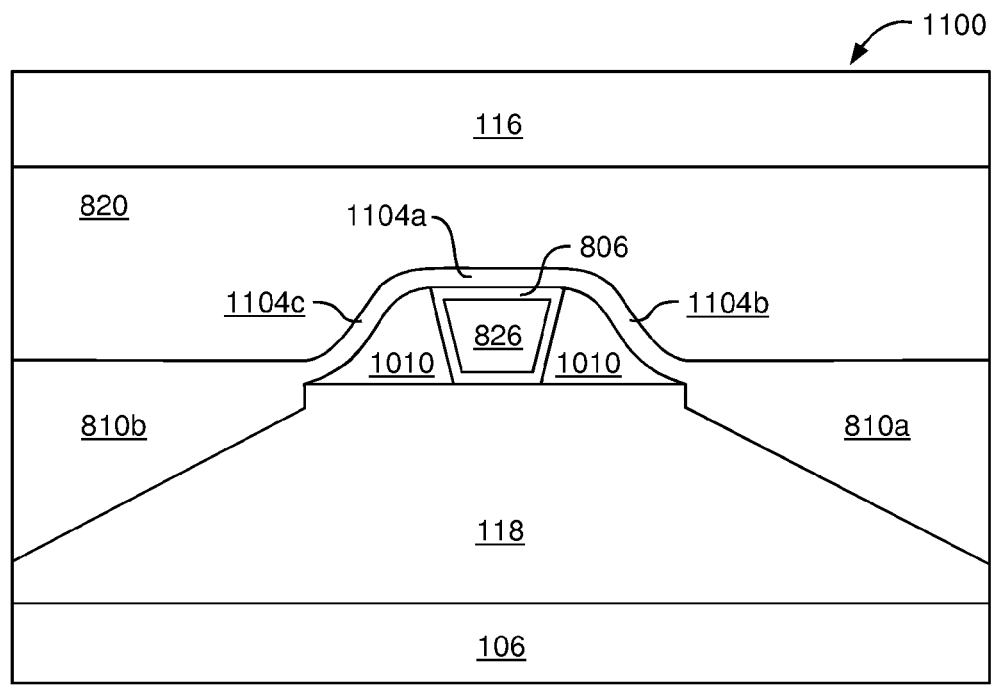
FIGS. 11A-11B are block diagrams of a nanofoil in a write head, according to an embodiment of the invention.
Figure 11B:
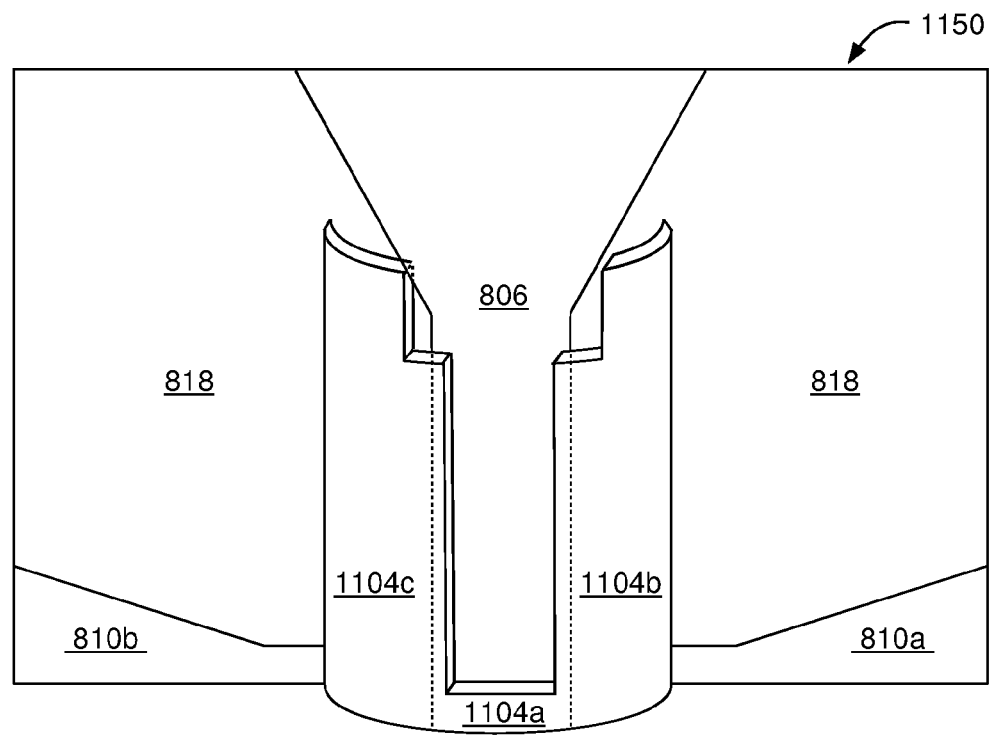

FIGS. 11A-11B are block diagrams illustrating a nanofoil according to an embodiment of the present invention. FIGS. 11A is an ABS view 1100 of a write head that uses a nanofoil 1104 to increase the current density near the tip of the write pole 826. Unlike a combined structure, the nanfoil 1104 maintains a consistent thickness throughout. Though not shown, the nanofoil 1104 may be separated from the WAS 820 by a thin layer of a dielectric material. Current provided by the horizontal conducting members 810a,b flows through the nanofoil 1104. The thin dielectric layer electrically isolates the WAS 820 from the current flowing in the nanofoil 1104 yet permits the heat transfer from the nanofoil 1104 to the WAS 820.

FIG. 11B is a plan view 1150 of the nanofoil shown in FIG. 11A. Specifically, the nanofoil 1104a,b,c consists of a radiator portion or portions 1104b,c and a nanowire portion 1104a. The radiator portions 1104b,c function much like the radiator 802 discussed in FIGS. 8A-B. Moreover, the radiator portions 1104b,c may be made of a different material than the nanowire portion 1104a—e.g., ruthentium and copper, respectively. Or the radiator portions 1104b,c may be divided into separate vertical or horizontal layers with different materials for each layer.

FIG. 11B illustrates the use of a current restraint (a two-level split) to increase the current density in a nanowire portion 1104a of the nanofoil 1104. This two-level split is similar to the nanofoil 502 disclosed in FIG. 6B. The nanofoil 1104 has tall radiator portions 1104b,c that extend above the flare point of the insulating layer 806. The first level would begin at a height that corresponds to the desired height of the nanowire portion 1104a and reaches to height less than the flare point of the insulating layer 806. The second level begins at the height less than the flare point but continues to a desired height above the flare point—e.g., 500 nm. This two-level split increases the surface area of the radiator portions 1104b,c to encourage heat transfer yet accommodates the present structure of write poles. Moreover, the two-level split constrains the current to the nanowire portion 1104a when the nanofoil 1104 is closest to the write pole 826. The current restraint may be created by using a variety of different shapes (e.g., triangular) or materials.

A combined structure may be substituted into FIGS. 11A-11B to replace the nanofoil 1104a,b,c. This combined structure may be the nanowire 204 and radiator 304 combination illustrated in FIG. 6A.

In one embodiment, the first level continues above the flare point of the main pole 826. That is, the flare point may begin at a height around 20-70 nm from the ABS. The first level may extend to a height of 70-150 nm while the second level may continue to a height around 500 nm. Thus, the two-level nanofoil 1104b,c may still be used to conduct heat from the nanowire portion 1104a for write poles 826 with flare points much less than 70 nm.

Figure 12A:
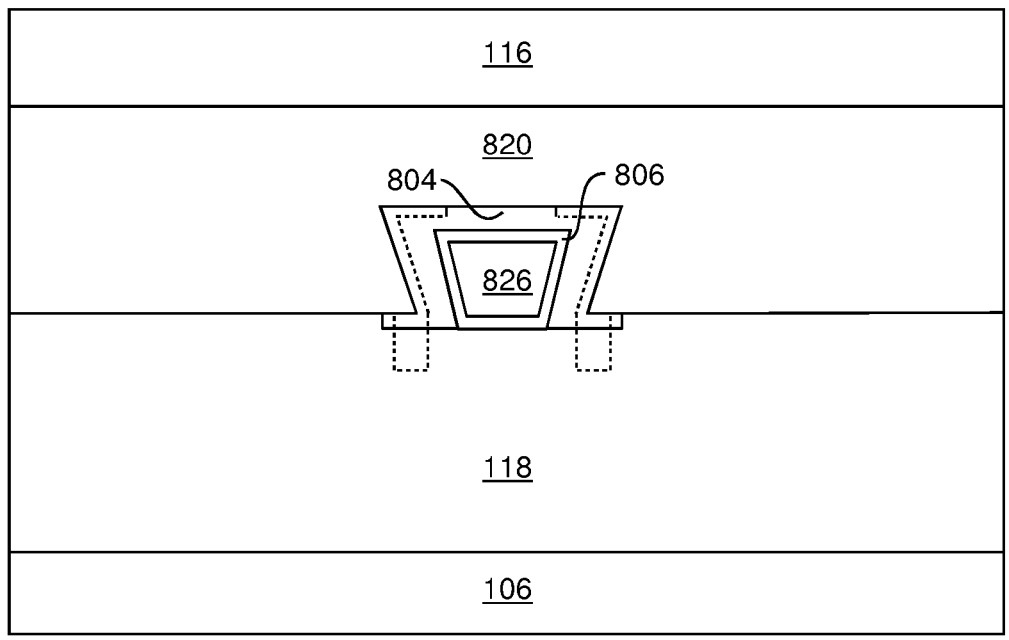
FIGS. 12A-12B are block diagrams of a combined structure in a write head, according to an embodiment of the invention.
Figure 12B:
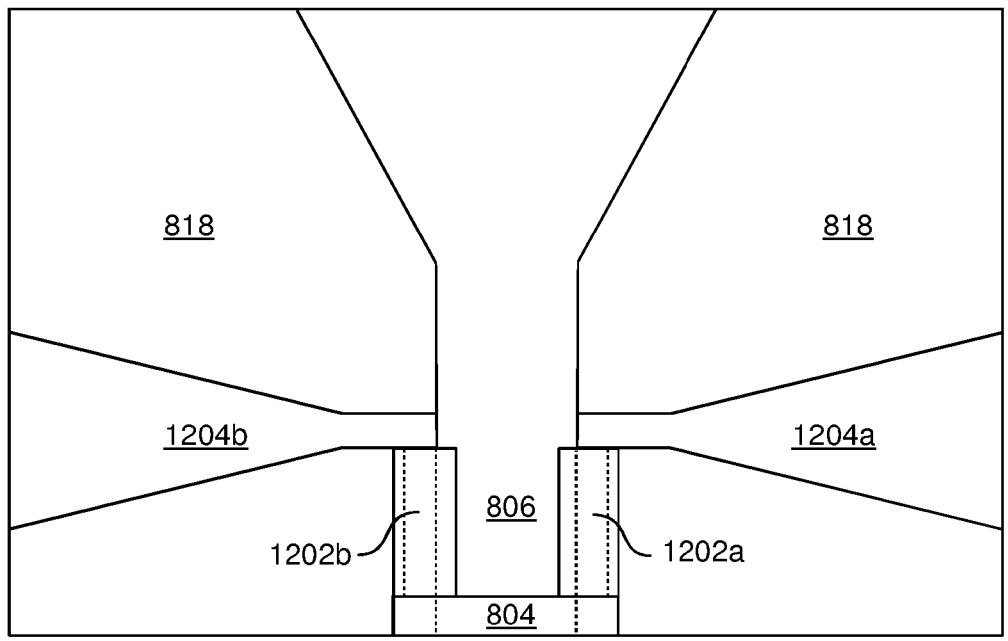

FIGS. 12A-12B are block diagrams illustrating a combined structure according to an embodiment of the present invention. FIG. 12A illustrates an ABS view of the combined structure which consists of a nanowire 804 and radiator divided into two portions 1202a, 1202b. As discussed previously, the radiator 1202 has a current restraint that aligns with the write pole 826 so that current flows primarily through the nanowire 804 at the location of the current restraint. FIG. 12B shows a plan view of the combined structure. In contrast to FIGS. 8B, 10B, and 11B, the current that flows through the nanowire 804 is introduced in the radiator 1202. The horizontal conductive members 1204a, 1204b are recessed away from the ABS surface and provide a thicker metal layer for connecting to the top of the radiator 1202 (i.e., the portion of the radiator furthest away from the ABS). The horizontal conductive members 1204a,b may become progressively thicker as they continue away from the write pole 806 and eventually connect to vias farther back into the write head.

Advantageously, current may be conducted through the radiator 1202 and into the nanowire 804 without connecting the nanowire 804 directly to a conductive member. Specifically, if both the radiator and nanowire 804 are made up of materials with the same resistivity (e.g., both structures are copper), then current may flow through the radiator 1202 to the nanowire 804 with little loss. This provides additional freedom when choosing the location of the horizontal conductive members 1204a,b.

Figure 13:
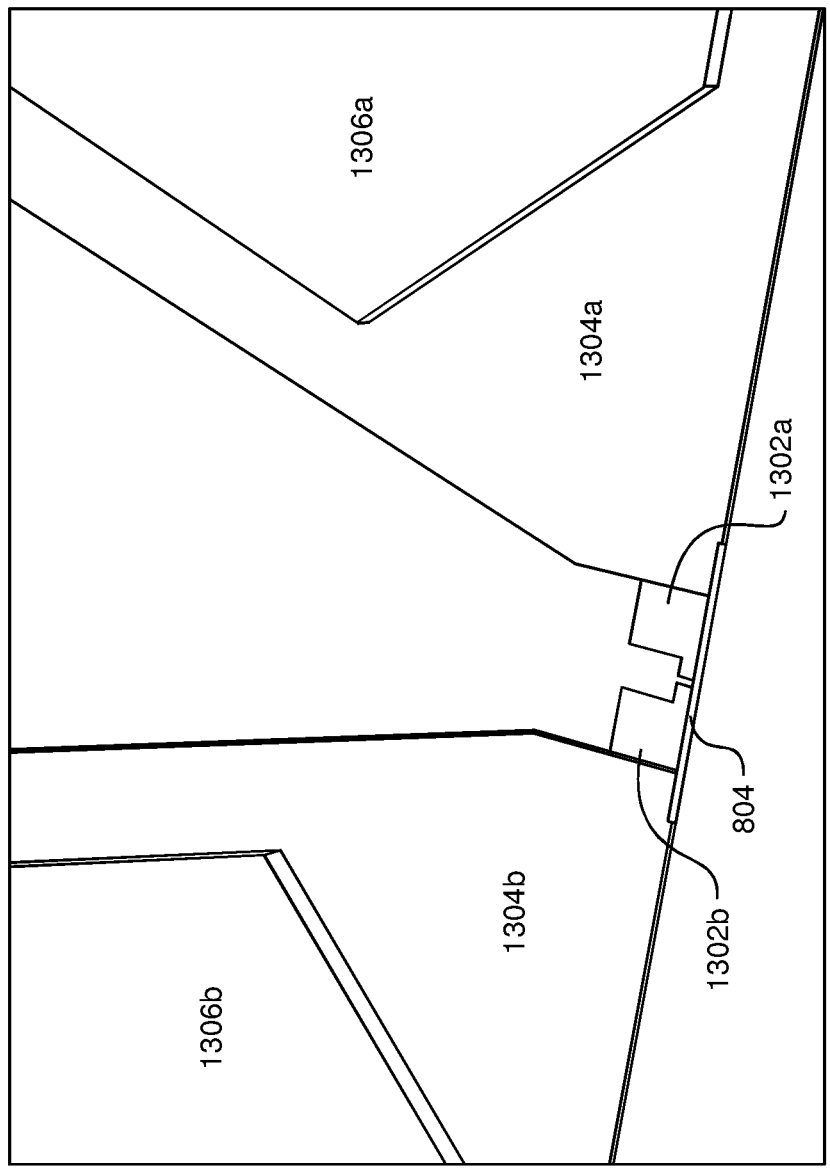
FIG. 13 illustrates a combined structure according to an embodiment of the present invention.

FIG. 13 illustrates a combined structure according to an embodiment of the present invention. In FIG. 13, the combined structure 804, 1302a,b is flattened (i.e., is parallel to only one side of the main pole) for illustrative purposes. The first conducting regions 1304a,b are electrically connected to either the nanowire 804 or the radiator 1302a,b (or both). The first conducting regions 1304a,b may comprise of low resistance metals (e.g., silver or copper). The second conducting regions 1306a,b are electrically coupled to the first conducting regions 1304a,b and may comprise of materials that have a higher resistivity than the materials comprising the first conducting regions 1304a,b. Because the connecting interface between the first conducting regions 1304a,b and the combined structure 804, 1302a,b may be much smaller than the connecting interface between the first and second conducting regions 1304a,b, 1306a,b, the choice of materials for the respective structures may depend on the surface area of the connecting interfaces. Stated differently, the resistivity of the materials used in the connection between the first conducting regions 1304a,b and the combined structure 804, 1302a,b may be less relative to the resistivity of the materials in the second conducting regions 1306a,b. Moreover, the electrical current may be fed to the nanowire 804 to take advantage of the widening of the first and second conducting regions 1304a,b, 1306a,b.

By providing a nanowire with a radiator, or by depositing a nanofoil with a radiator portion, the current density in a nanowire may be increased to provide a strong magnetic write field near a tip of a write pole. This magnetic field permits the write pole to write data to high-coercivity media.

While the foregoing is directed to embodiments of the present invention, other and further embodiments of the invention may be devised without departing from the basic scope thereof, and the scope thereof is determined by the claims that follow.

The invention claimed is:

1. A perpendicular head, comprising:
   a write pole, wherein a surface of the write pole is exposed at an air bearing surface (ABS) of the perpendicular head;
   a shield layer comprising a magnetic material;
   a nanowire that is substantially parallel to at least one side of the write pole, the nanowire permitting current to flow therethrough to produce a magnetic field at the surface of the write pole exposed at the ABS; and
   a radiator directly connected to a side of the nanowire that is one of: opposite the ABS and parallel to the at least one side of the write pole, and the radiator is disposed between the shield layer and the write pole.

2. The perpendicular head of claim 1, wherein the radiator further comprises a current restraint that limits an amount of the current flowing through the current restraint relative to a portion of the radiator without the current restraint.

3. The perpendicular head of claim 2, wherein the current restraint is arranged such that a portion of the current restraint is substantially parallel to the at least one side of the write pole.

4. The perpendicular head of claim 2, wherein the current restraint is a slit in the radiator.

5. The perpendicular head of claim 2, wherein the current restraint is at least one of the following: a doped portion of the radiator, a resistive material deposited into the radiator, a grating of the radiator, and an oxidized portion of the radiator.

6. The perpendicular head of claim 1, wherein the nanowire is disposed at the ABS, and wherein the radiator is arranged to transfer heat from the nanowire to the shield layer.

7. The perpendicular head of claim 1, further comprising a main coil having a plurality of turns operable to affect a magnetization state of the write pole.

8. The perpendicular head of claim 1, wherein the shield layer is a wrap around shield and wherein a shape of the radiator conforms to a shape of a surface of the wrap around shield that faces a surface of the write pole.

9. The perpendicular head of claim 1, wherein the radiator is comprised of a material with a lower electrical conductivity than the nanowire.

10. The perpendicular head of claim 1, wherein the radiator is comprised of the same material as the nanowire.

11. The perpendicular head of claim 10, wherein the radiator further comprises a current restraint that limits an amount of the current flowing through the current restraint, the current restraint is arranged such that a portion of the current restraint is substantially parallel to the at least one side of the write pole.

12. The perpendicular head of claim 1, wherein a thickness of the nanowire in a direction perpendicular to the flow of the current is less than 25 nm.

13. The perpendicular head of claim 12, wherein a thickness of the radiator in a direction perpendicular to the flow of the current is less than 15 nm.

14. A perpendicular head, comprising:
- a write pole, wherein a surface of the write pole is exposed at an air bearing surface (ABS) of the perpendicular head;
- a nanofoil substantially parallel to at least one side of the write pole, the nanofoil permitting current to flow therethrough to produce a magnetic field at the surface of the write pole exposed at the ABS, the nanofoil having a current restraint in a top portion of the nanofoil furthest away from the ABS that limits an amount of the current flowing through the current restraint relative to a bottom portion of the nanofoil that lacks the current restraint, the current restraint arranged such that a portion of the current restraint is substantially parallel to the at least one side of the write pole; and
- a shield layer comprising a magnetic material, wherein a radiator portion of the nanofoil is disposed between the shield layer and the write pole.

15. The perpendicular head of claim 14, wherein the current restraint is a slit in the nanofoil.

16. The perpendicular head of claim 15, wherein the slit is a same length, as measured in the direction that the current flows in the nanofoil, as a length of the at least one side of the write pole.

17. The perpendicular head of claim 14, wherein the current restraint is at least one of the following: a doped portion of the nanofoil, a resistive material deposited into the nanofoil, a grating of the nanofoil, and an oxidized portion of the nanofoil.

18. The perpendicular head of claim 14, wherein the nanofoil is disposed at the ABS, and wherein the radiator portion of the nanofoil is arranged to transfer heat from the nanofoil to the shield layer.

19. The perpendicular head of claim 14, further comprising a main coil having a plurality of turns operable to affect the magnetization state of said pole layer.

20. The perpendicular head of claim 14, wherein the shield layer is a wrap around shield, wherein a shape of the nanofoil substantially conforms to a shape of at least one surface of the wrap around shield that faces a side surface of the write pole.

21. The perpendicular head of claim 20, wherein the nanofoil contacts an insulating layer between the write pole and the nanofoil.

22. The perpendicular head of claim 14, wherein the nanofoil comprises at least a first layer and a second layer, wherein the first and second layers are different materials.

23. The perpendicular head of claim 22, wherein the first layer comprises a material with a higher electrical conductivity than a material of the second layer.

24. The perpendicular head of claim 14, wherein the nanofoil thickness is less than 25 nm in a direction perpendicular to the flow of current.

* * * * *